US009168873B2

(12) United States Patent
Angelo

(10) Patent No.: US 9,168,873 B2
(45) Date of Patent: Oct. 27, 2015

(54) SELF-DEPLOYING SERVICE STEP

(71) Applicant: Gerald J. Angelo, Bellevue, WA (US)

(72) Inventor: Gerald J. Angelo, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 87 days.

(21) Appl. No.: 14/047,781

(22) Filed: Oct. 7, 2013

(65) Prior Publication Data

US 2015/0096817 A1   Apr. 9, 2015

(51) Int. Cl.
*B60R 3/02* (2006.01)
*E06C 5/04* (2006.01)
*B60R 3/00* (2006.01)

(52) U.S. Cl.
CPC ... *B60R 3/02* (2013.01); *E06C 5/04* (2013.01); *B60R 3/007* (2013.01)

(58) Field of Classification Search
CPC ........ B60R 3/02; B60R 3/007; B62D 33/063; E06C 5/04
USPC .......................... 180/89.18; 280/166; 182/127
See application file for complete search history.

(56) References Cited

U.S. PATENT DOCUMENTS

| 2,118,557 | A | 5/1938 | Hamilton |
|---|---|---|---|
| 2,125,085 | A | 7/1938 | Pool |
| 3,419,099 | A | 12/1968 | Brumbaugh |
| 3,853,369 | A | 12/1974 | Holden |
| 3,889,997 | A | 6/1975 | Schoneck |
| 3,986,724 | A | 10/1976 | Rivinius |
| 4,021,071 | A | 5/1977 | Norman |
| 4,106,790 | A | 8/1978 | Weiler |
| 4,180,143 | A | 12/1979 | Clugston |
| 4,813,736 | A | 3/1989 | Schubert |
| 4,836,568 | A | 6/1989 | Preslik |
| 4,921,062 | A | 5/1990 | Marlowe |
| 4,982,974 | A | 1/1991 | Guidry |
| 5,092,617 | A | 3/1992 | Jones, Jr. |
| 5,257,847 | A | 11/1993 | Yonehara |
| 5,538,265 | A | 7/1996 | Chen |
| D434,348 | S | 11/2000 | Delashaw |
| 6,213,486 | B1 | 4/2001 | Kunz |
| 6,264,222 | B1 * | 7/2001 | Johnston et al. .............. 280/166 |
| 6,736,447 | B2 | 5/2004 | Angelo |

(Continued)

FOREIGN PATENT DOCUMENTS

| RU | 2 466 884 C2 | 8/2012 |
|---|---|---|
| SU | 935342 A1 | 6/1982 |
| WO | 2011/116415 A1 | 9/2011 |

OTHER PUBLICATIONS

International Search Report and Written Opinion mailed Dec. 4, 2014, issued in corresponding International Application No. PCT/US2014/053579, filed Aug. 29, 2014, 5 pages.

*Primary Examiner* — Karen Beck
(74) *Attorney, Agent, or Firm* — Christensen O'Connor Johnson Kindness PLLC

(57) ABSTRACT

A cab-over-engine vehicle is described wherein the cab is supported in a level orientation on the vehicle's chassis. A cab repositioning system raises the cab while maintaining the cab in the level orientation, thus exposing the engine to be worked on. A service step structure that is hidden within the exterior body when the cab is over the engine is deployed when the cab is raised. The service step structure is connected to the underside of the cab such that the service step structure swings down and away from the exterior body to provide access to the raised level cab at the same time allowing access to the engine.

22 Claims, 9 Drawing Sheets

(56) References Cited

U.S. PATENT DOCUMENTS

| | | |
|---|---|---|
| 6,817,433 B1 * | 11/2004 | Bergstrom et al. ........ 180/89.12 |
| D532,731 S | 11/2006 | Angelo |
| 7,168,722 B1 | 1/2007 | Piotrowski |
| D539,704 S | 4/2007 | Angelo |
| D549,146 S | 8/2007 | Kieffer |
| D561,647 S | 2/2008 | Simons |
| D563,281 S | 3/2008 | Simons |
| D570,253 S | 6/2008 | Cunagin |
| D607,395 S | 1/2010 | Beigel |
| D632,224 S | 2/2011 | Peltola |
| 8,157,277 B2 | 4/2012 | Leitner |
| 2002/0082752 A1 * | 6/2002 | Obradovich ...................... 701/1 |
| 2009/0065301 A1 | 3/2009 | Ellement |
| 2014/0048352 A1 * | 2/2014 | Takenawa et al. ............. 182/97 |
| 2014/0125017 A1 * | 5/2014 | Kasuga et al. ............ 280/5.514 |
| 2014/0251711 A1 * | 9/2014 | Angelo et al. ................ 180/271 |

* cited by examiner

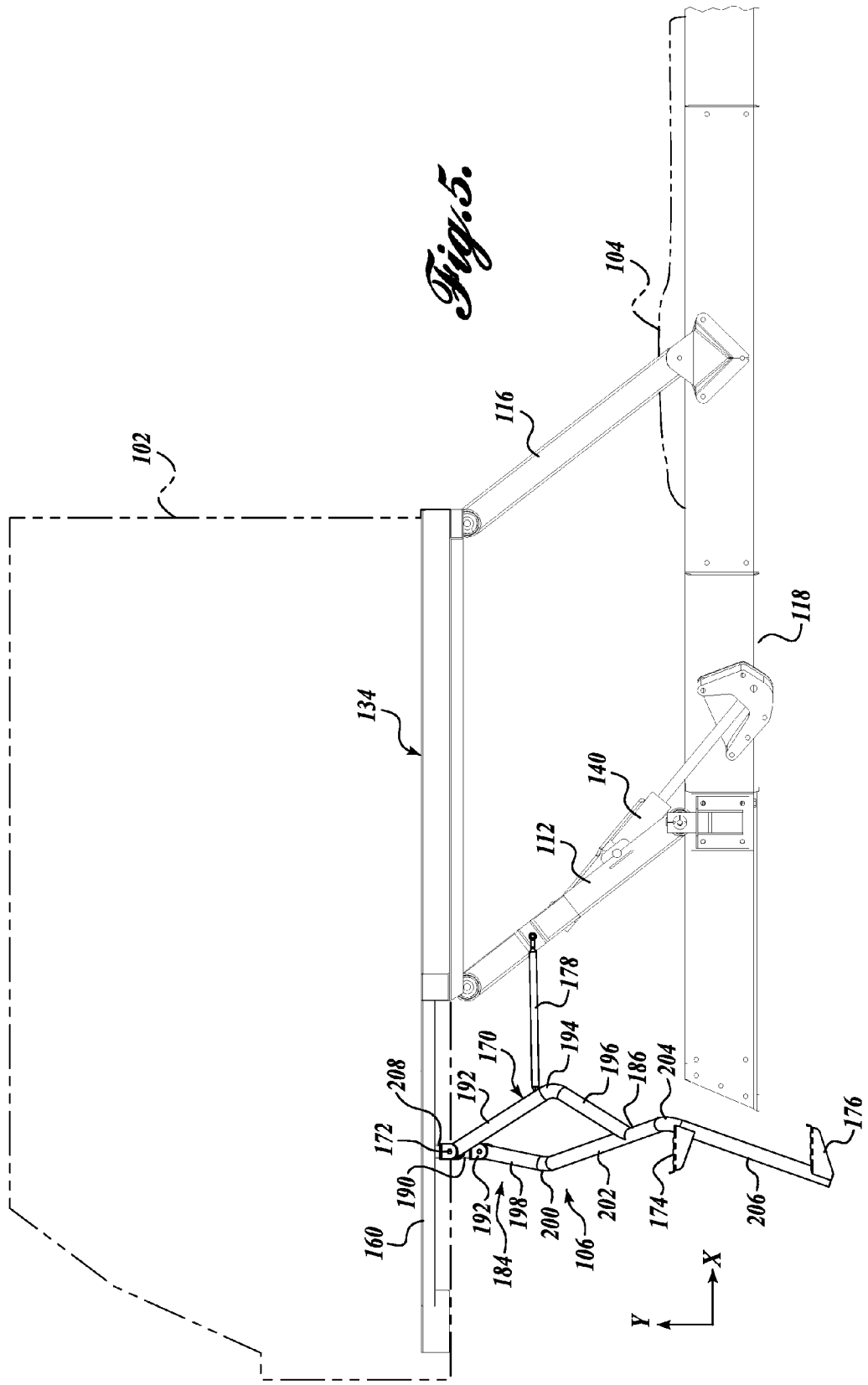

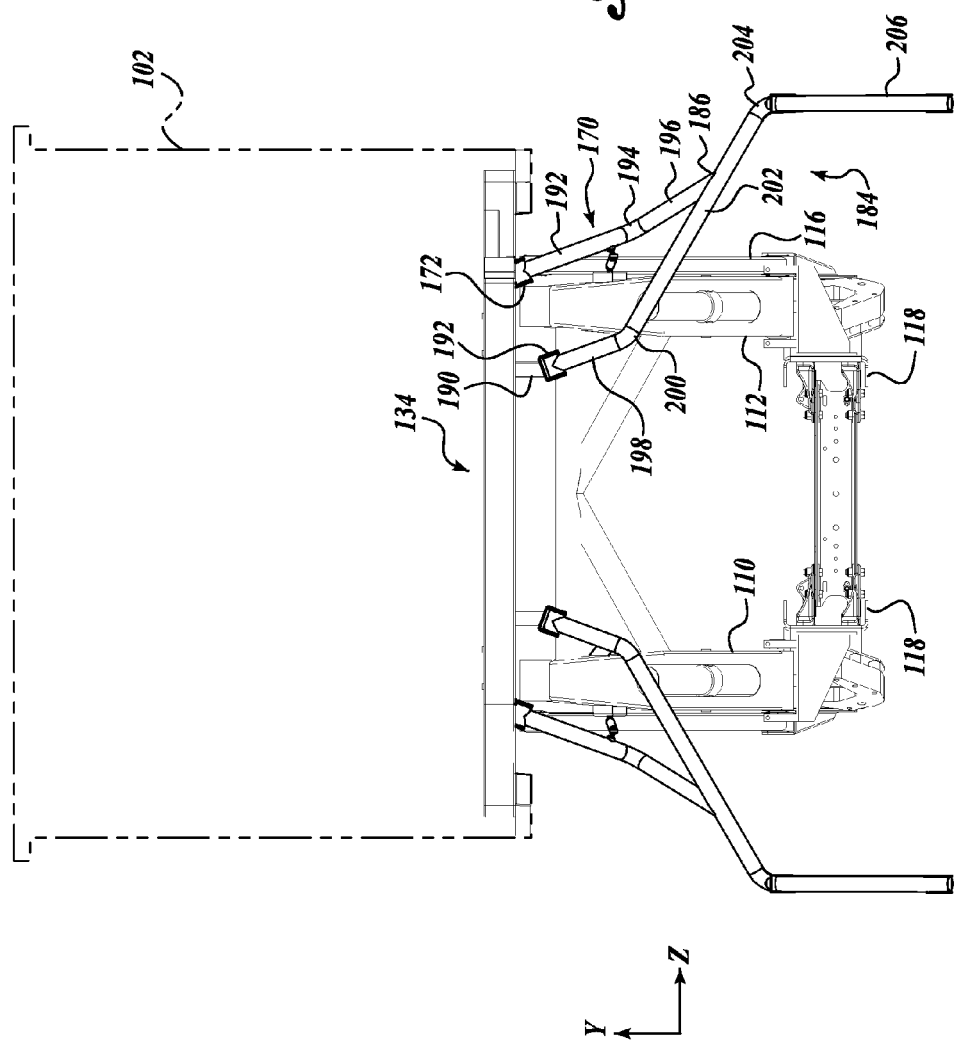

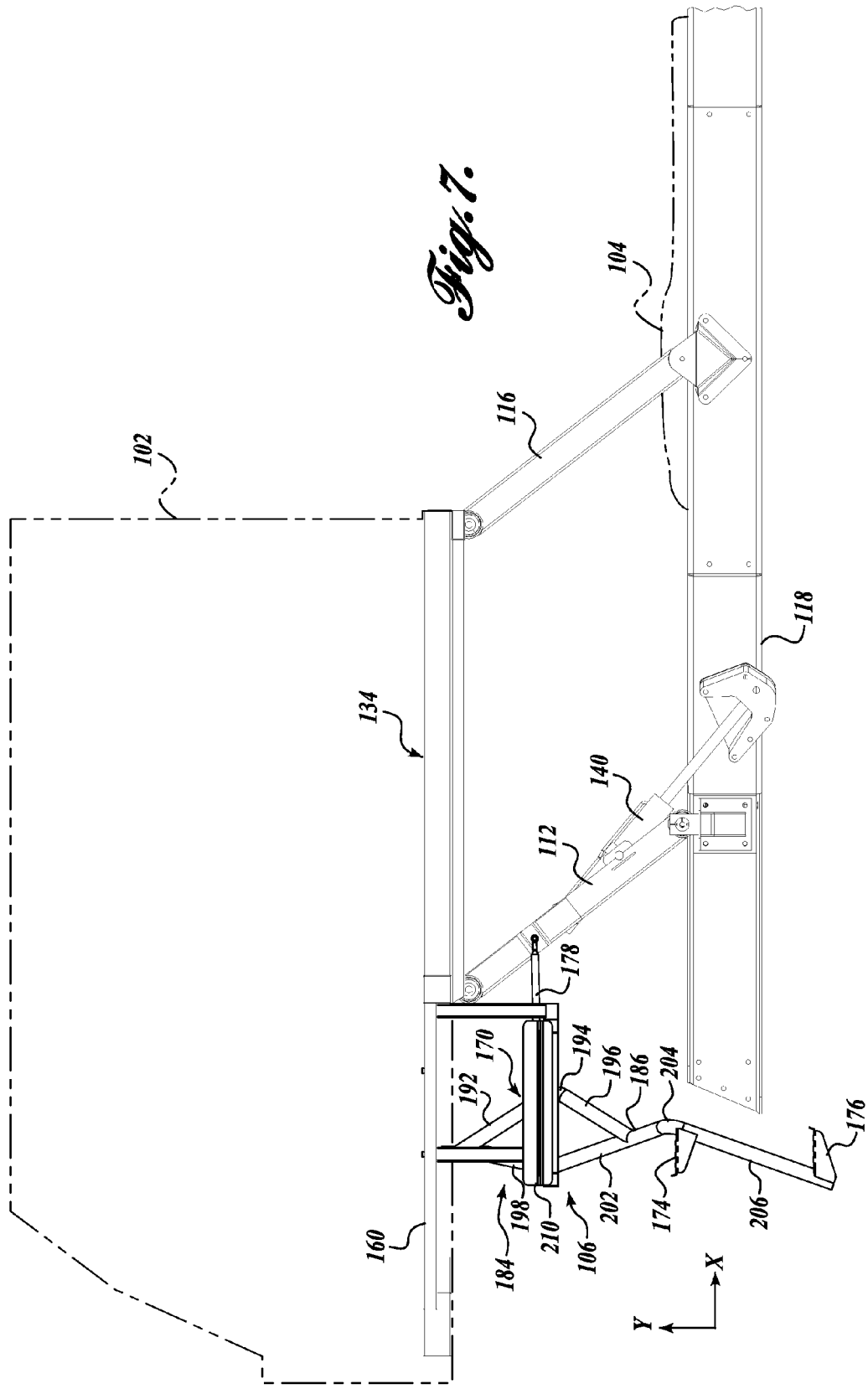

SELF-DEPLOYING SERVICE STEP

BACKGROUND

It is often desirable to access the driver's cab on a truck while the engine is being serviced. On trucks in which the cab is mounted behind the engine, the cab can be readily accessed because the cab can remain in the normal driving position—the engine is in front of the cab and the cab does not interfere with access to the engine. In contrast, a cab-over-engine (COE) truck has the cab supported over the engine. A COE truck is often desirable to keep the overall vehicle length to within allowable or legal limits. However, in order to service the engine in a COE truck, the cab must first be moved out of the way to gain access to the engine. In a conventional COE configuration, the cab can be tilted, typically around a horizontal axis near the lower front of the cab. Since it would be difficult and/or dangerous to move about within a tilted cab, steps leading to the tilted cab are not provided.

SUMMARY

A cab and access service steps are described herein that provide a safer environment for working in the interior of a cab in a raised service position. A COE vehicle configuration has been developed wherein as the cab is moved to expose the engine, the cab is maintained in a generally level or horizontal orientation while the cab is raised and forward of the engine. It is therefore possible to move about the cab even when it is in the service position, because the cab remains in a horizontal position, albeit at a higher elevation than the normal position. The problem then becomes providing a set of steps to access the cab in this raised, level position. A fixed set of steps on the cab could be provided. However, exterior fixed steps could have a detrimental effect on the aerodynamic performance of the vehicle and are therefore less desirable. Accordingly, embodiments of service steps are described that stow under the vehicle's exterior body and out of the air flow when the cab is in the normal driving position, and the service steps deploy by swinging down and out to provide access to the cab when in the raised, level service position. A system of control linkages deploys the service steps when the cab is being raised and stow the steps when the cab is again being lowered.

In some embodiments, a vehicle includes a chassis; a cab supported in a level orientation by the chassis; an engine supported by the chassis; and a service step structure pivotably connected to the cab.

In some embodiments, the level cab is positioned forward of and elevated in relation to the engine wherein the engine is exposed, and the service step structure includes one or more steps positioned exterior to the cab, and the steps are positioned to allow access to a cab entry.

In some embodiments, the level cab is positioned over the engine to conceal the engine, and the service step structure is in a lying position interior to an exterior body of the vehicle.

In some embodiments, the service step structure is connected to the cab via a tilt axis pivoting assembly.

In some embodiments, the tilt axis is tilted with respect to a transverse plane.

In some embodiments, the tilt axis is parallel to a frontal plane.

In some embodiments, the tilt axis is tilted with respect to a frontal plane and parallel to a transverse plane.

In some embodiments, the tilt axis is tilted with respect to a frontal plane and a transverse plane.

In some embodiments, the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane.

In some embodiments, the first and second axes are parallel to a frontal plane.

In some embodiments, the first axis is spatially separated from the second axis along a line parallel with the frontal plane.

In some embodiments, a distal end of the first bar is connected to the second bar at a juncture, and the second bar extends distally from the juncture and comprises one or more foot pegs.

In some embodiments, the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane and are parallel to a frontal plane.

In some embodiments, the first bar comprises: a first straight segment extending perpendicular to the first tilt axis, wherein the first segment extends posteriorly from the frontal plane; a second straight segment; a first bend having an obtuse angle that connects the first segment to the second segment; and the second bar comprises: a third straight segment extending perpendicular to the second tilt axis, wherein the third segment extends anteriorly from the frontal plane; a fourth straight segment; a second bend having an obtuse angle that connects the third segment to the fourth segment; a fifth straight segment; a third bend having an obtuse angle that connects the fourth segment to the fifth segment; and the distal end of the second segment is rigidly connected to the fourth segment.

In some embodiments, the first, second, third, and fourth segments are tilted with respect to a side plane passing through a longitudinal center of the cab, and the fifth segment is parallel to the side plane.

In some embodiments, the fifth segment includes one or more foot pegs.

In some embodiments, the cab includes one or more steps, and the one or more steps of the service step structure are aligned with the one or more steps of the cab.

In some embodiments, the vehicle further comprises a cab repositioning system and a linkage, wherein the linkage is pivotably connected to the repositioning system and to the service step structure.

In some embodiments, the repositioning system comprises a control arm, wherein the control arm is pivotably connected to the chassis and pivotably connected to the cab, and the service step structure includes at least one bar connected to the cab via a tilt axis pivoting assembly, and the linkage is connected to the bar and the control arm.

In some embodiments, a pivot axis of the control arm at the cab and a pivot axis of the control arm at the chassis are normal to a side plane.

In some embodiments, a vehicle further comprises a cab repositioning system, wherein the repositioning system comprises at least four control arms pivotably connected to the chassis and pivotably connected to the cab, wherein a pivot axis of each of the control arms is normal to a side plane.

In some embodiments, one or more control arms are connected to a hydraulic cylinder.

In some embodiments, the vehicle may include any one, more than one, or all of the foregoing combinations of features.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a diagrammatical illustration showing a portion of a vehicle with a service step structure in the deployed position;

FIG. 6 is a diagrammatical illustration showing a portion of a vehicle with a service step structure in the deployed position;

FIG. 7 is a diagrammatical illustration showing a portion of a vehicle with a service step structure in the deployed position;

DETAILED DESCRIPTION

Figure 1:
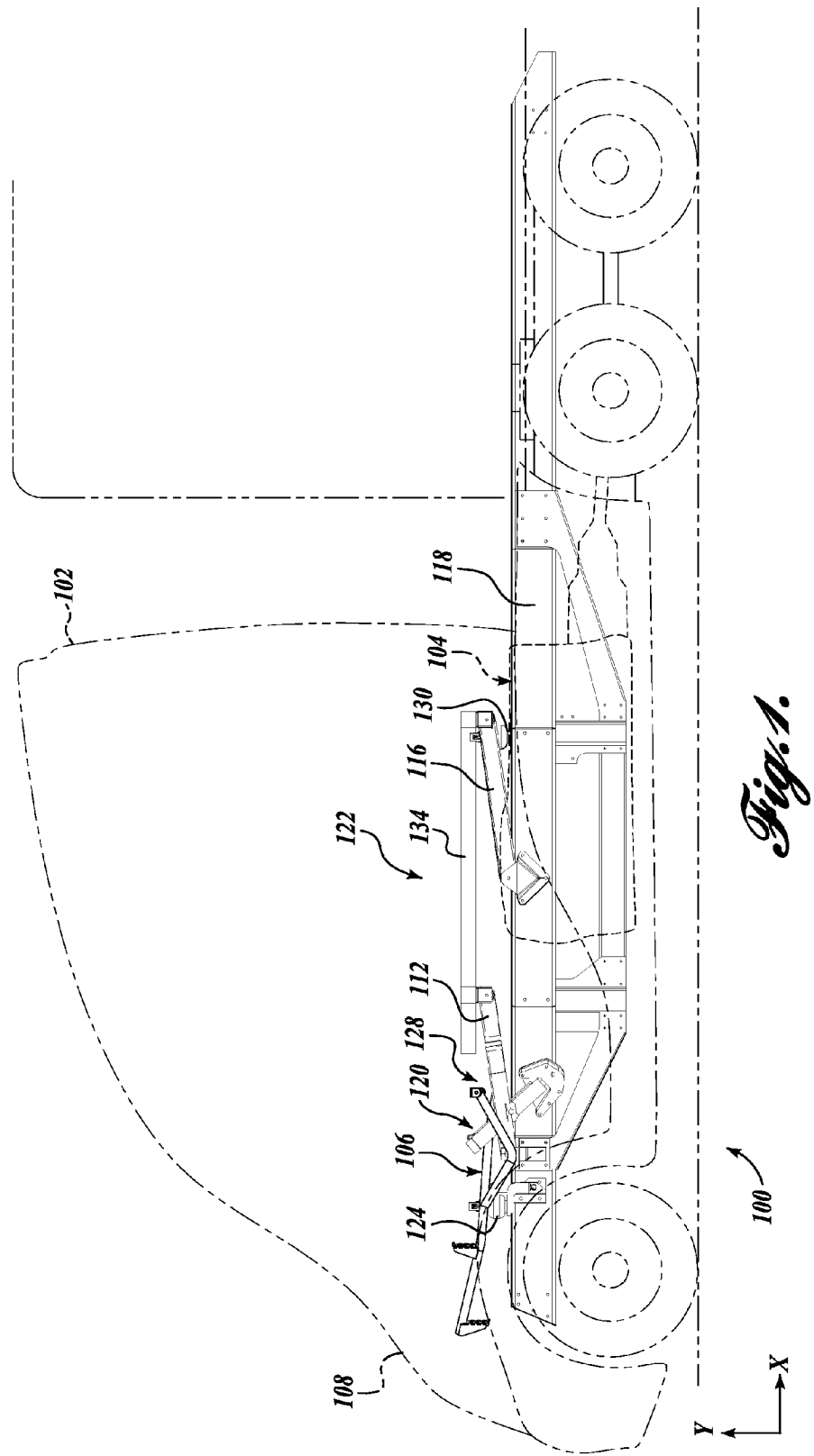
FIG. 1 is a diagrammatical illustration showing a vehicle with a service step structure.

FIG. 1 diagrammatically illustrates a vehicle 100, such as a truck, and in particular a cab-over-engine (COE) truck. As the name implies, a COE truck 100 includes a repositionable cab 102 over a stationary engine 104 (shown in dashed lines). Both the cab 102 and the engine 104 are supported by the chassis 118. The cab 102 is specifically supported by a cab suspension system 124, 130 and a repositioning system 122. The repositioning system 122 supports a platform frame 134 to hold the other framework enclosed within the cab 102. The FIGURES illustrate a COE vehicle configuration wherein, as the cab 102 is moved to expose the engine 104, the cab 102 is maintained in a generally level or horizontal orientation while the cab 102 is raised and moved forward with the repositioning system. It is therefore possible to move about the cab 102 even when it is in the service position, because the cab 102 remains in a horizontal position, albeit at a higher elevation than the normal operating position. To solve the problem of accessing the raised, level cab 102, a service step structure 106 is described that stows under the vehicle's exterior body 108 (shown in dashed lines) where it is out of the air flow when the vehicle 100 is being driven. When the cab 102 is raised and moved forward, the service step structure 106 is deployed and comes to rest exposing foot pegs or other steps exterior to the body 108. The service step structure 106, when deploying, swings down and out to provide access to the cab 102 when in the raised, level service position.

The cab 102 is an enclosure for housing the driver and the controls. The cab 102 may also include a sleeper berth. The cab 102 includes and is supported on the platform frame 134, which in turn is connected to pivotable rotating control arms 110, 112, 114, and 116. One end of the control arms 110, 112, 114, and 116 is connected to the underside of the platform frame 134, while the opposite end of the control arms 110, 112, 114, and 116 is connected to the chassis 118. Connections of the control arms 110, 112, 114, and 116 to the platform frame 134 and to the chassis 118 are pivoting connections that may each include an axle and bushings or roller bearings to allow pivoting. At least one control arm 110, 112, 114, and 116 can be connected to a hydraulic system 120. When the cab 102 is in the normal position, such as for driving, the control arms 110, 112, 114, and 116 are in a lying position and, generally, almost level with the ground. While in the lying position, the control arms 110, 112, 114, and 116 are positioned such that the pivoting connection to the platform frame 134 is to the rear of the pivoting connection to the chassis 118. The pivot axes of the control arms 110, 112, 114, and 116 are parallel to each other and are normal to any side plane (the Y-X plane). A side plane is any vertical plane that divides the vehicle 100 into right and left sides. A side plane that passes through the longitudinal center of the vehicle is the centerline side plane.

Figure 2:
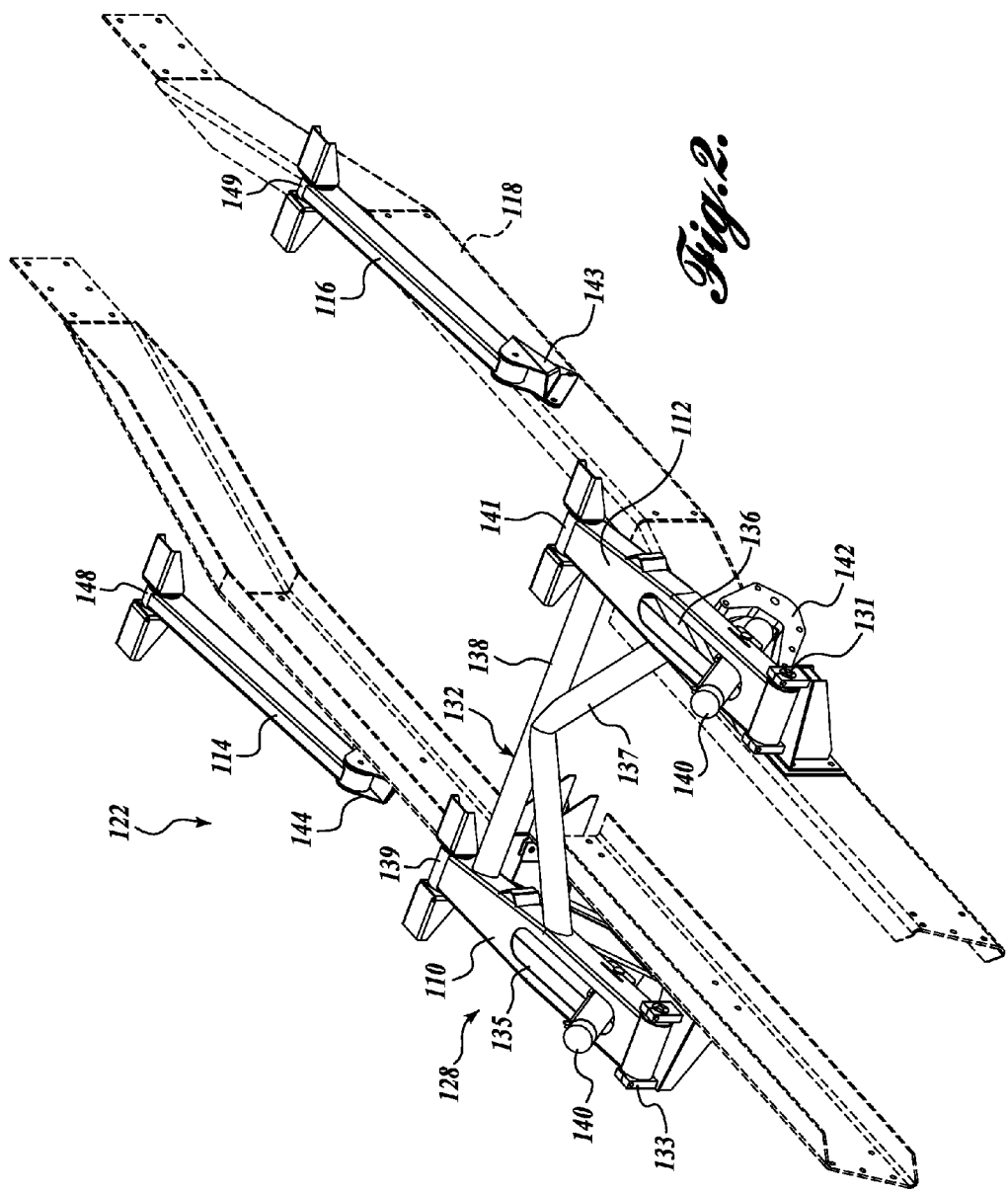
FIG. 2 is a diagrammatical illustration showing a cab repositioning system.

The cab suspension system includes the right and left front suspension assemblies 124 that are configured to engage and support a forward portion of the cab 102 and a rear suspension assembly 130 that is configured to engage and support a rearward end of the cab 102. A cab repositioning system 122 is shown in FIG. 2. The cab repositioning system 122 includes a repositioning control arm assembly 126 including a front arm assembly 128 and right and left rear control arms 114, 116. The front arm assembly includes right and left front control arms 110, 112 that engage the cab 102 at an intermediate location and provide repositioning functionality via hydraulic cylinders 140.

The front control arm assembly 128 includes a U-shaped member 132 that is pivotably attached to the chassis 118 and a pair of hydraulic cylinders 140 that are configured to selectively pivot the U-shaped member 132 between a first lying down position or normal operating position, wherein the cab 102 is positioned near to horizontal or level, and a second upright position, wherein the cab 102 is disposed away from the chassis 118 and is elevated and forward as compared to the first normal position. The U-shaped member 132 includes a left-front control arm 112 having one end attached to one side of the chassis 118 with a pivot assembly 131 and a right-front control arm 110 having one end attached to the other side of the chassis 118 with a pivot assembly 133. The front control arms 110, 112 each define an elongate aperture 135, 136 that is sized to pivotably receive the corresponding hydraulic cylinder 140. The control arms 110, 112 are connected to each other at the inboard side with a torsion member 138 extending therebetween and perpendicular to the arms 110, 112, and angled bracing 137 extending between the torsion member 138 and the inboard side of each control arm 110, 112.

The hydraulic cylinder 140 of the left-front control arm is pivotably attached to the chassis 118 with a bracket 142 (the right side not being visible). Although not visible in the FIGURES, the cylinder 140 may include an elongate slot through which the cylinder 140 is pivotably attached to the chassis 118. The elongate slot is approximately aligned with the associated cylinder 140, and is configured to permit the cylinder 140 to slidably accommodate the vertical motion of the cab 102 permitted by the cab suspension system during operation, without inducing any significant load on the cylinders 140. The cylinder 140 extends through the elongate aperture 136, which is sized to accommodate the relative motion between the control arm 112 and the cylinder 140 without interference.

The rear control arms 114, 116 can be square tube members. The right-rear control arm 114 is pivotably attached to the chassis 118 with a pivot assembly 144 and the left-rear control arm 116 is pivotably attached to the chassis 118 with a pivot assembly 143. The control arms 114, 116 are follower control arms (not hydraulically powered), each with a second pivot assembly 148, 149 that is configured to pivotably attach the respective control arm 114, 116 to the underside of the platform frame 134.

The U-shaped member 132 controls side roll, sway, and fore-aft pitch. The front control arms 110, 112 are pivotably attached to the platform frame 134 with the pivot assemblies 139, 141 at an intermediate location, generally slightly forward of the cab's 102 center of gravity. The pivot assemblies 148, 149 for the rear control arms 114, 116 are attached near the rear end of the cab platform frame 134. However, other configurations are possible and may be preferable in certain applications. For example, it is contemplated that the control arms 114, 116 may alternatively be positioned to engage a forward portion of the platform frame 134, and the control arms 110, 112 may engage the platform frame 134 at an intermediate location rearward of the center of gravity. In some applications, it may be desirable to reposition the cab laterally, rather than longitudinally. It is contemplated that the control arms 110, 112, 114, 116 may be oriented and configured to pivot about axes parallel to the centerline of the chassis 118 or at an acute angle with respect to the chassis 118, wherein the control arms 110, 112 engage a left side of the platform frame 134 and the control arms 114, 116 engage the right side of the platform frame 134.

To provide access to the engine 104, the cab 102 can be positioned away from the chassis 118 without any substantial rotation of the cab 102 via the repositioning system 122. The control arms 110, 112, 114, 116 are substantially of equal length and parallel. In the first or operating position, the control arms 110, 112, 114, 116 are disposed at an angle of between about five degrees and fifteen degrees, for example, approximately eight degrees, with respect to the chassis 112.

The hydraulic cylinder 140 is a double-acting hydraulic cylinder with the ram end pivotably connected to the chassis 118 at a point aft of and below the pivot assembly 131. A double-acting hydraulic cylinder 140 allows the cab 102 to be returned from the raised position to the operating position by reversing the hydraulic fluid flow to the cylinder 140. However, a single-acting hydraulic cylinder may alternatively be used. Alternatively, other modes of actuation are contemplated. For example, it is contemplated that an electric motor system may be used to move the cab 102.

The hydraulic cylinders 140 are used to raise the cab 102 from the normal position to a service position, wherein the cab 102 is elevated and forward as compared to the normal position. As the cab 102 rises and moves forward, exposing the stationary engine 104, the control arms 110, 112, 114, and 116 rotate from the lying position into a more upright position, such that the control arms 110, 112, 114, and 116 can rotate past vertical and come to rest anterior to a frontal plane (Y-Z plane) passing through the axes of rotation at the chassis 118. A frontal plane is a vertical plane that is normal to the longitudinal axis of the vehicle 100. A frontal plane divides the vehicle 100 into a forward and rear section. This motion is used to deploy at least one service step structure 106 from the stowed position shown in FIG. 3 into the deployed position shown in FIG. 4. The service step structure 106 can be provided on one or both sides of the cab 102. For brevity, the single step structure of one side will be described, it being understood that the second step structure will be similar. Furthermore, although a COE truck 100 is illustrated, the service step structure can be suitable for many other types of vehicles or in different applications where stowable/deployable service steps may be desired.

Figure 3:
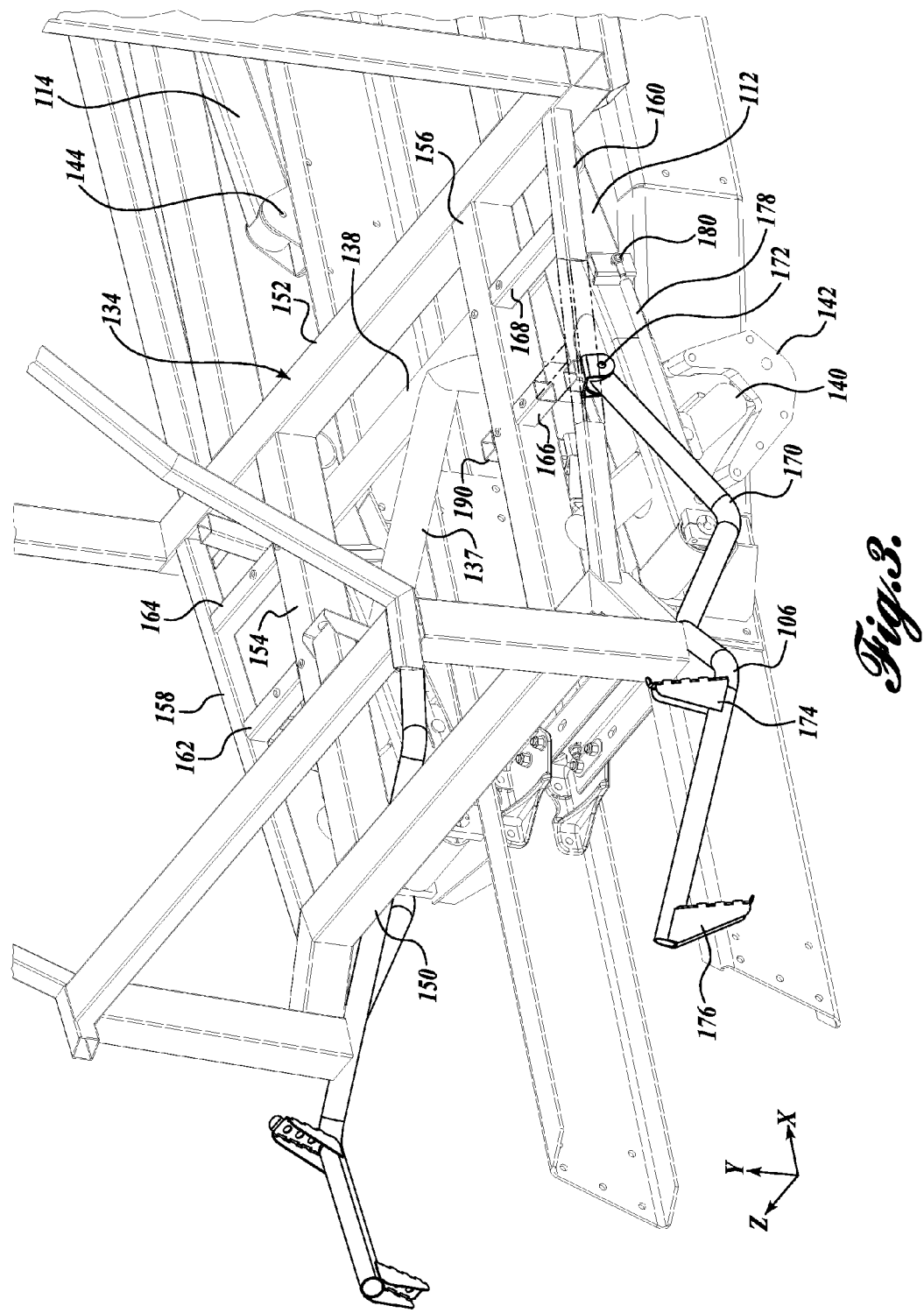
FIG. 3 is a diagrammatical illustration showing a portion of a vehicle with a service step structure in the stowed position.

Referring to FIG. 3, the cab 102 is supported on the platform frame 134, on which the control arms 110, 112, 114, and 116 act upon. The platform frame 134 forms the floor of the cab 102 and provides structural integrity to the cab 102. The platform frame 134 supports the cab's structural frame. The platform frame 134 is formed by beams that are parallel to a transverse plane. The front section of the platform frame 134 includes a forward transverse beam 150 and a rear transverse beam 152. The forward and rear transverse beams 150, 152 are connected to each other with longitudinally placed right and left inboard beams 154, 156, respectively. The forward and rear transverse beams 150, 152 are also connected to each other with angled right and left outboard beams 158, 160. The right inboard beam 154 is rigidly connected to the right outboard beam 158 with two transverse beams 162, 164. The left inboard beam 156 is rigidly connected to the left outboard beam 160 with two transverse beams 166, 168. The beam 166 is partly shown in phantom to allow viewing of the service step structure 106. The beams of the platform frame 134 described above are generally parallel to a transverse plane, and thus, the platform frame 134 and the cab 102 it supports are generally level when in a position covering the engine 104 and when in a position exposing the engine 104.

The service step structure 106 is shown in the lying or stowed position when the cab 102 is in the normal operating position in FIG. 3. The service step structure 106 is shown in the upright deployed position when the cab 102 is in the raised forward or service position in FIGS. 4, 5, and 6. The service step structure 106 moves from the stowed position to the deployed position upon raising of the cab 102. A service step structure 106 may include at least one bar 170 that is pivotably attached to the platform frame 134. The service step structure 106 is rigid to support the weight of a person accessing the cab 102. In some embodiments, the bar 170 is connected at the tilt axis pivoting assembly 172 that is rigidly connected on the underside of the forward transverse beam 166 connecting the left inboard beam 156 to the left outboard beam 160. However, the bar 170 may be attached at any other suitable structure that rises when the cab 102 rises. The bar 170 extends distally from the tilt axis pivoting assembly 172 to include one or more foot pegs. In the embodiment shown, the service step structure 106 may include two foot pegs 174, 176. While in the lying or stowed position, the bar 170 is inboard from and covered by the vehicle's exterior body 108. When in the upright or deployed position, the bar 170 moves partly outboard of the vehicle's exterior body 108 to allow climbing thereon. In order to swing the service step structure 106 outward, the pivot axis 172 is placed at an angle greater than 0 with respect to a transverse plane (the X-Z plane). A transverse plane is a horizontal plane and divides the vehicle 100 into upper and lower sections. That is, the pivot axis 172 is tilted so that the outboard end of the pivot axis 172 is higher with respect to the inboard end (in the Y direction). However, both ends of the pivot axis 172, and therefore the pivot axis 172, lie parallel to any frontal plane (the Y-Z plane). The bar 170 may be bent so as to avoid interference with any other structure, such as the fender, when moving from the lying stowed position to the upright deployed position. The service step structure 106 may swing down under the force of gravity. However, in other embodiments, the service step structure 106 is connected via a rigid linkage 178 to the control arm 112. The linkage 178 includes a pivot assembly 182 (FIG. 4) at the connection to the bar 170, and the linkage 178 includes the pivot assembly 180 at the connection to the control arm 112. The linkage 178 can be rigid except at the pivoting connections. The linkage 178 positively pulls the service step structure 106 downwards upon raising the cab 102 and positively pushes the service step structure upwards to the lying stowed position. However, a manually operated service step structure is possible. For example, the cab can first be raised, and then the service step structure may be unlatched from the lying stowed position and manually placed in the deployed position. While a linkage is shown connecting the service step structure 106 to the control arm 112, the linkage may be attached to any other control arm or even a stationary structure such as the chassis 118. Furthermore, depending on the placement of the linkage in relation to the service step structure, the linkage may push the service step structure downward and pull the service step structure upwards to the lying stowed position.

Figure 4:
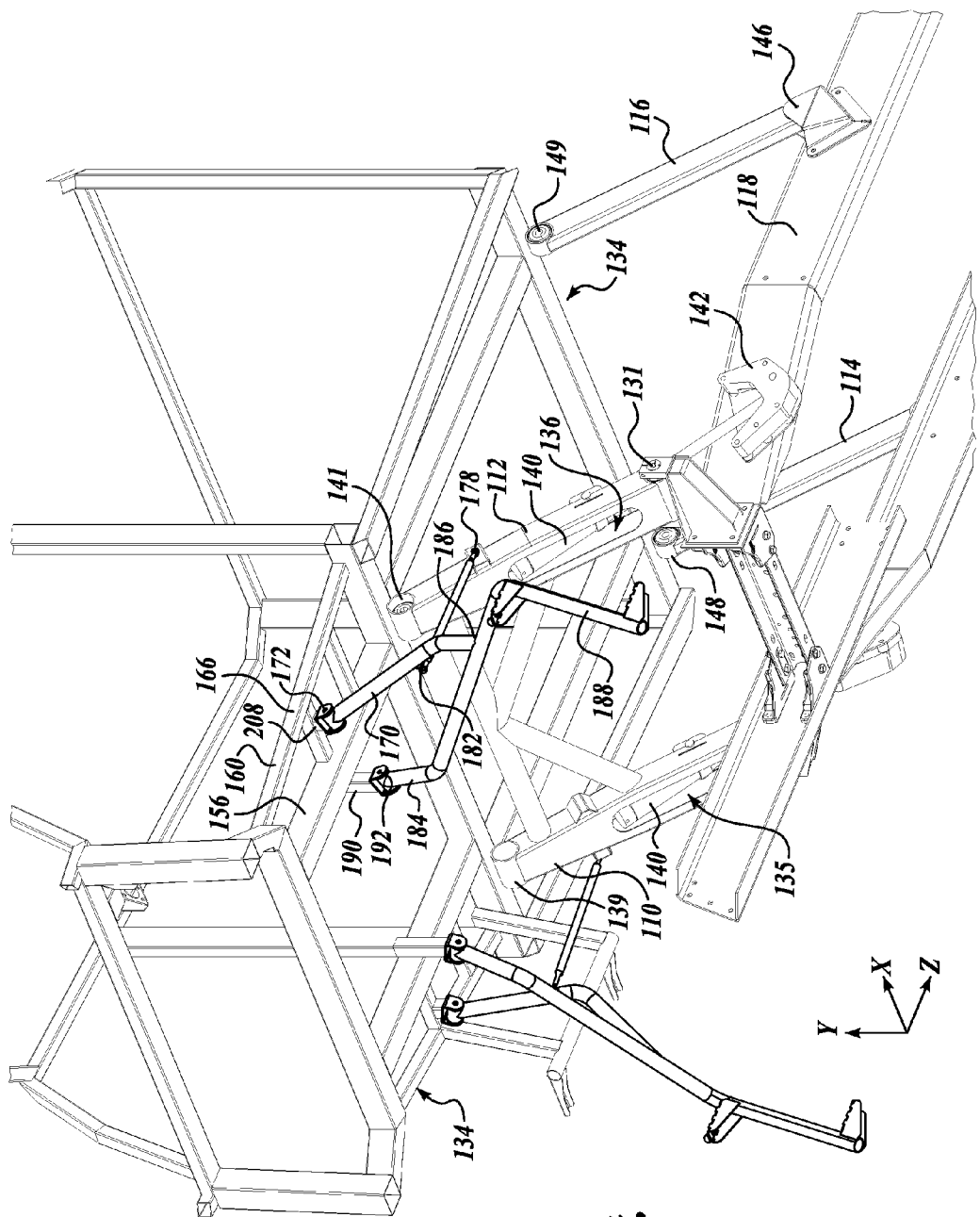
FIG. 4 is a diagrammatical illustration showing a portion of a vehicle with a service step structure in the deployed position.

In some embodiments, the service step structure 106 includes a first bar 170 pivotably connected to the transverse beam 166 and a second bar 184 (FIG. 4). The first bar 170 and the second bar 184 connect to each other at a junction 186, and the service step structure 106 continues as a single bar 188 distally from the junction 186. The first bar 170 is pivotably connected to the platform frame 134 at an outboard position, as described above, and the second bar 184 is pivotably connected to the platform frame 134 at a position that is inboard from the connection for the bar 170. Specifically, the second bar 184 is pivotably connected to a downward extending bar 190 that, in turn, is connected to the inboard beam 156. The second bar 184 is connected to the bar 190 via the tilt axis pivoting assembly 192. While in the lying or stowed position, the bar 184 is inboard from and covered by the vehicle's exterior body 108. When in the upright or deployed position, the bar 184 moves outboard. In order to swing the bar 184 outboard, the pivot axis 192 is placed at an angle with respect to any transverse plane (the X-Z plane). That is, the pivot axis 192 is tilted so that the outboard end of the pivot axis 192 is higher in the Y direction with respect to the inboard end. However, both ends of the pivot axis 192, and, therefore, the pivot axis 192 lies parallel to any frontal plane (the Y-Z plane). Furthermore, the pivot axis 192 of the inboard bar 184 is collinear with the pivot axis 172 of the outboard bar 170. The linkage 178 is connected to the first bar 170 as described above.

Figure 8A:
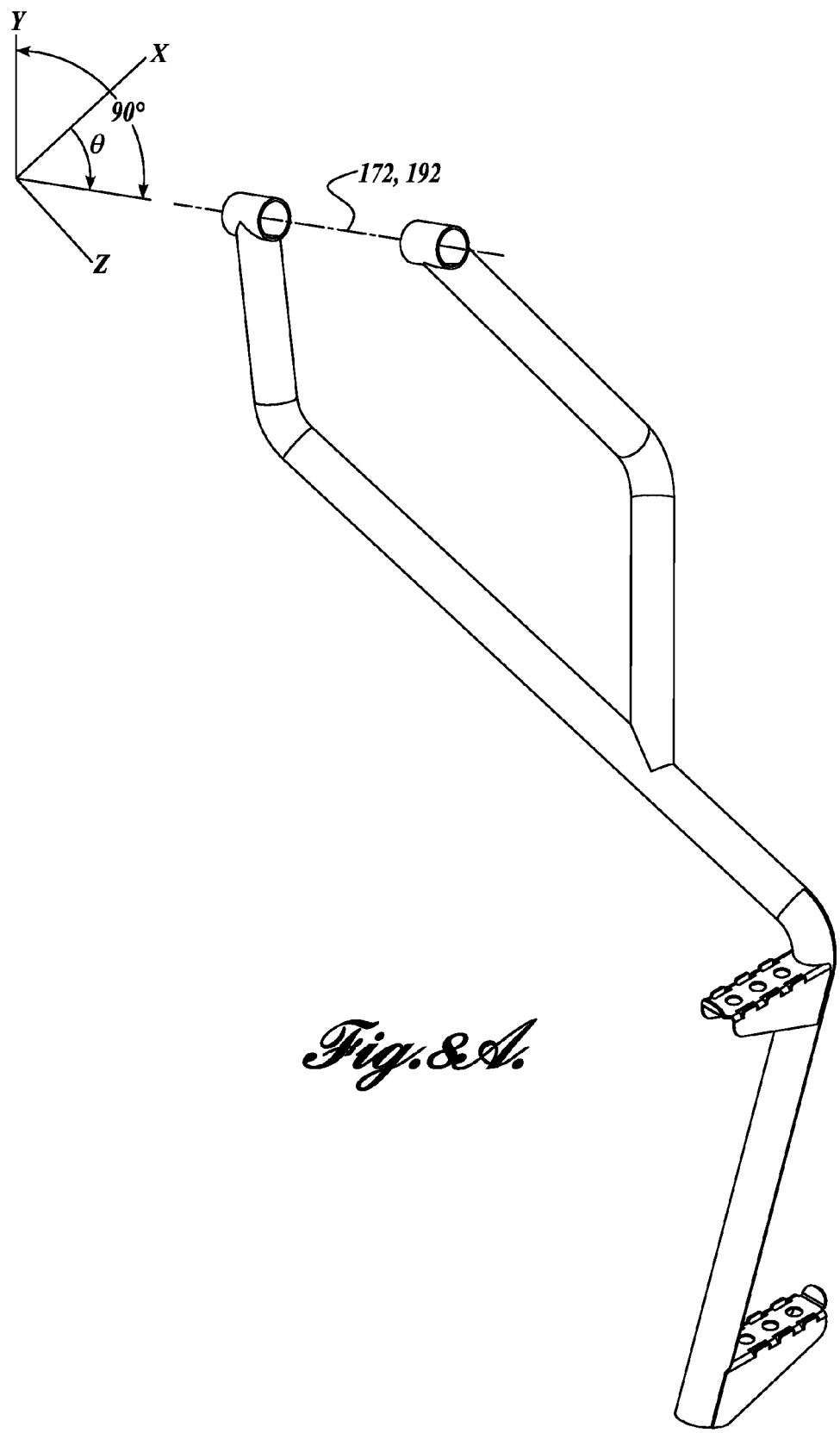
FIG. 8A is a diagrammatical illustration showing a tilt axis pivoting assembly parallel in the transverse plane and tilted with respect to the frontal plane.
Figure 8B:
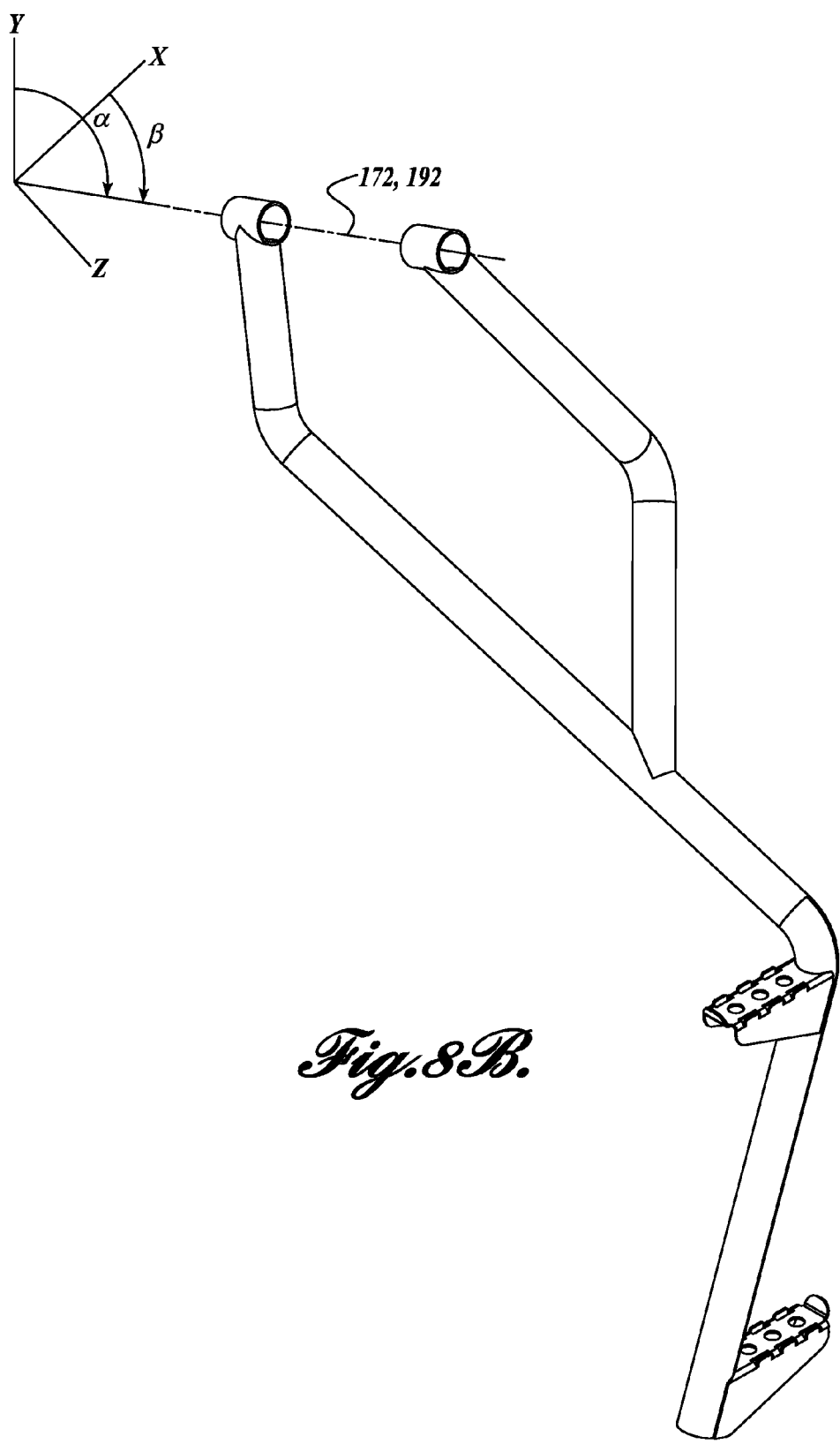
FIG. 8B is a diagrammatical illustration showing a tilt axis pivoting assembly tilted in the transverse plane and the frontal plane.

In some embodiments, the service step structure 106 can be made of a single bar having a tilt axis pivoting assembly connected at the platform frame. However, in other embodiments, the service step structure 106 can be made from any number of bars and any number of tilt axis pivoting assemblies, wherein the pivot axes 172, 192 are parallel to a frontal plane and tilted in the transverse plane to swing out while swinging down. Other embodiments may have the tilt axis pivoting assemblies 172, 192 tilted with respect to the frontal plane and parallel to the transverse plane as seen in FIG. 8A (where θ is between 0 and 180 degrees, except for 90 degrees), or tilted with respect to both the frontal plane and the transverse plane as seen in FIG. 8B (where α and β are between 0 and 180 degrees, except for 90 degrees). Additional crossbars between two or more bars may be included to provide for torsional strength, for example.

In some embodiments, the service step structure 106 can be made of two distinct tubular steel elements that have been bent in a certain way. The two distinct tubular steel elements are welded to each other to create the illustrated service step structure 106. Referring to FIGS. 5 and 6, the service step structure 106 can include the first bar 170 being a short tube having the shape of an "L" and the second bar 184 being a relatively longer tube having the shape of a "Z". The first tube 170 includes two straight tube segments 192, 196 joined at a bend segment 194. The first proximal segment 192 is perpendicular to the pivot axis 172. A pivot bushing receptacle is welded to the proximal end of the tube segment 192. The bushing is placed within a shaft or pivot axis. Roller bearings may also be used. When in the deployed position, the first segment 192 extends posteriorly from the frontal plane passing through the pivot axis 172 (FIG. 5). The first straight segment 192 joins with the second straight segment 190 at the bend 194. The bend 194 can have an obtuse angle. The bend 194 changes the direction of the bar 170 so that the second straight segment 196 extends anteriorly from the distal end of the first straight segment 192. The control linkage 178 is pivotably connected to the first bar 170 approximately at the distal end of the first straight segment 192. The distal end of the second straight segment 196 ends approximately at the frontal plane passing through the axis 172, where it is welded to the second bar 184.

The second distinct bar 184 includes three straight tube segments 198, 202, and 206 joined to one another at bends 200 and 204. In the bar 184, the first straight proximal segment 198 extends perpendicular to the pivot axis 192. A pivot bushing receptacle is welded at the proximal end of the first tube segment 198. The bushing is placed within a shaft or pivot axis. Roller bearings may also be used. When in the deployed position, the first segment 198 extends anteriorly of the frontal plane passing through the pivot axis 192 (FIG. 5). The first straight segment 198 joins with the second, intermediate straight segment 202 at the bend 200. The bend 200 changes the direction of the bar 184 so that the second straight segment 202 extends posteriorly from the distal end of the first straight segment 198. The bend 200 can have an obtuse angle. The distal end of the second intermediate straight segment 202 ends approximately at the frontal plane passing through the axis 192. The distal end of the second intermediate straight segment 202 joins with the third distal straight segment 206 at the bend 204. The bend 204 can have an obtuse angle. The bend 204 changes the direction of the bar 184 so that the third straight segment 206 extends anteriorly from the distal end of the second straight segment 202. The third distal segment 206 includes the foot peg 174 at the proximal end and the foot peg 176 at the distal end.

Referring to FIG. 6, the angle of tilt of the pivot axes 172 and 192 in the transverse plane is translated into an angle of tilt of the first segment 192 of the first bar 170 and the first segment 198 of the second bar 184 with respect to a side plane, because the segments 192 and 198 are perpendicular to the axes 172, 192, respectively. The first 192 and second 196 segments of the first bar 170 are tilted with respect to a side plane that passes through the centerline of the cab 102, for example. The angle of tilting can be an acute angle with respect to such centerline side plane. The first 198 and second 202 segments of the second bar 184 are tilted with respect to the same side plane. The angle of tilting is sufficient to place the distal end of the segments 196 and 202 above any exterior body coverings, such as fenders. The third segment 206 of the second bar 184 can be made parallel to the same side plane, because the third segment 206 is connected to the second segment 202 high enough and outboardly enough to clear any exterior body parts.

The distal end of the second straight segment 196 of the first tube 170 is rigidly joined approximately almost at the distal end of the second intermediate straight segment 202 of the second tube 184 at the junction 186, which is approximately at the frontal plane passing through both the inboard axis 192 and the outboard axis 172. The first bar 170 comprising the two straight segments described above is pivotably connected to the platform frame 134 at an outboard position, as described above, and the second bar 184 comprising the three straight segments described above is pivotably connected to the platform frame 134 at an inboard position. Specifically, the first bar 170 is connected to a small downward extending bar 208 that in turn is connected to the transverse beam 166 that in turn connects to the outboard beam 160. The first bar 170 is connected to the bar 208 via the tilt axis pivoting assembly 172. The second bar 184 is connected to the downward extending bar 190 that in turn is connected to the side of the inboard beam 156. The second bar 184 is connected to the bar 190 via the tilt axis pivoting assembly 192. While in the lying or stowed position, the service step structure 106 is covered by the vehicle's exterior body 108. When in the upright or deployed position, the whole of the service step structure is made to swing down and outboard. In order to swing the service step structure outboard, the pivot axes 172 and 192 are placed at an angle with respect to a transverse plane (the X-Z plane). That is, the pivot axes 172 and 192 are tilted so that the outboard ends are higher in the Y direction with respect to the inboard ends. The pivot axis 172 is higher in the Y direction and outboard with respect to the pivot axis 192. Both pivot axes 172 and 192 lie parallel in a frontal plane (the Y-Z plane). However, other embodiments may have the axes 172, 192 tilted with respect to the frontal plane and parallel to the transverse plane as seen in FIG. 8A (where θ is between 0 and 180 degrees, except for 90 degrees), or tilted with respect to both the frontal plane and the transverse plane as seen in FIG. 8B (where α and β are between 0 and 180 degrees, except for 90 degrees). In FIGS. 8A and 8B, the Y axis is vertical, and the X and Z axes are horizontal. So, the transverse plane is the X-Z plane, and the frontal plane is the Y-Z plane. Additionally, the pivot axis 192 is collinear with the pivot axis 172, meaning that the pivot axis 172 and the pivot axis 192 lie on a straight line parallel to a frontal plane, albeit tilted with respect to a transverse plane. The pivot axis 192 is spatially separated from the pivot axis 172. The separation of the first bar 170 and the second bar 184 provides a clearance space for the hydraulic cylinder 140 when the service step structure 106 is in the lying stowed position. Furthermore, the addition of the first bar 170 to the second bar 184 in a two-bar configuration allows the smaller "L"-shaped bar 170 to serve as a stabilizing brace for the service step structure 106 as well as providing an attachment location for the linkage 178.

While the service step structure 106 is described for the left side of the vehicle 100, a similar service step structure may be provided on the right side of the vehicle. Furthermore, the spatial orientation of the service step structure 106 will allow a person of skill to understand how the service step structure 106 is oriented when in the lying stowed position. For example, when in the lying stowed position, the axes 172 and 192 remain parallel to the frontal plane while the bars 170 and 184 will be moved inboard with respect to the upright deployed position.

Referring to FIG. 7, the deployed service step structure 106 is shown with a pre-existing step 210 on the cab 102. In some embodiments, the cab 102 will have a step 210 that is normally used when accessing the entryway of the cab 102 in the normal driving position. The service step structure is deployed such that foot pegs 174, 176 become aligned with the step on the cab, such that the service step structure is used to permit entry to the cab via the entryway.

The cab 102 is releasably attached to the cab suspension system with latches, for example. One end of the forward control arms 110, 112 is pivotably attached to the chassis 118 and configured to pivot about a first axis. An opposite end of the control arms 110, 112 is pivotably attached to the cab's platform frame 134 and configured to pivot about a second axis parallel to the first axis. In some embodiments, the control arms 110, 112 engage the cab 102 forward of the cab's 102 center of gravity. One end of the rear control arms 114, 116 is pivotably attached to the chassis 118 and configured to pivot about a third parallel axis. The opposite end of each of the rear control arms 114, 116 is pivotably attached to the cab's platform frame 134 and configured to pivot about a fourth parallel axis. In some embodiments, the rear control arms 114, 116 engage a rearward portion of the cab 102.

The hydraulic cylinders 140 are pivotably attached to the chassis 118 and are pivotably attached to the forward control arms 110, 112, and configured to move the U-shaped member 132 and the cab 102 from the normal lying position to the upright and forward service position, while the linkage positively moves the service step structure 106 into the upright deployed position. Sensors may be used to detect whether the cab 102 is latched or unlatched, and the latches themselves may be automatically remotely operated. Sensors may also detect when the cab 102 reaches the forward and upward limit of travel. The use of the four control arms 110, 112, 114, and 116 allows movement of the cab 102 between these positions without pivoting the cab 102 in the transverse plane, and also allows maintaining the cab 102 in a level position throughout its movement.

In some embodiments, a vehicle includes a chassis; a cab supported in a level orientation by the chassis; an engine supported by the chassis; and a service step structure pivotably connected to the cab.

In some embodiments, the level cab is positioned forward of, and elevated in relation to, the engine, wherein the engine is exposed, and the service step structure includes one or more steps positioned exterior to the cab, and the steps are positioned to allow access to a cab entry.

In some embodiments, the level cab is positioned over the engine to conceal the engine, and the service step structure is in a lying position interior to an exterior body of the vehicle.

In some embodiments, the service step structure is connected to the cab via a tilt axis pivoting assembly.

In some embodiments, the tilt axis is tilted with respect to a transverse plane.

In some embodiments, the tilt axis is parallel to a frontal plane.

In some embodiments, the tilt axis is tilted with respect to a frontal plane and parallel to a transverse plane.

In some embodiments, the tilt axis is tilted with respect to a frontal plane and a transverse plane.

In some embodiments, the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane.

In some embodiments, the first and second axes are parallel to a frontal plane.

In some embodiments, the first axis is spatially separated from the second axis along a line parallel with the frontal plane.

In some embodiments, a distal end of the first bar is connected to the second bar at a juncture, and the second bar extends distally from the juncture and comprises one or more foot pegs.

In some embodiments, the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane and are parallel to a frontal plane.

In some embodiments, the first bar comprises: a first straight segment extending perpendicular to the first tilt axis, wherein the first segment extends posteriorly from the frontal plane; a second straight segment; a first bend having an obtuse angle that connects the first segment to the second segment; and the second bar comprises: a third straight segment extending perpendicular to the second tilt axis, wherein the third segment extends anteriorly from the frontal plane; a fourth straight segment; a second bend having an obtuse angle that connects the third segment to the fourth segment; a fifth straight segment; a third bend having an obtuse angle that connects the fourth segment to the fifth segment; and the distal end of the second segment is rigidly connected to the fourth segment.

In some embodiments, the first, second, third, and fourth segments are tilted with respect to a side plane passing through a longitudinal center of the cab, and the fifth segment is parallel to the side plane.

In some embodiments, the fifth segment includes one or more foot pegs.

In some embodiments, the cab includes one or more steps, and the one or more steps of the service step structure are aligned with the one or more steps of the cab.

In some embodiments, the vehicle further comprises a cab repositioning system and a linkage, wherein the linkage is pivotably connected to the repositioning system and to the service step structure.

In some embodiments, the repositioning system comprises a control arm, wherein the control arm is pivotably connected to the chassis and pivotably connected to the cab, and the service step structure includes at least one bar connected to the cab via a tilt axis pivoting assembly, and the linkage is connected to the bar and the control arm.

In some embodiments, a pivot axis of the control arm at the cab and a pivot axis of the control arm at the chassis are normal to a side plane.

In some embodiments, a vehicle further comprises a cab repositioning system, wherein the repositioning system comprises at least four control arms pivotably connected to the chassis and pivotably connected to the cab, wherein a pivot axis of each of the control arms is normal to a side plane.

In some embodiments, one or more control arms are connected to a hydraulic cylinder.

In some embodiments, the vehicle may include any one, more than one, or all of the foregoing combinations of features.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
   a chassis;
   a cab supported in a level orientation by the chassis;
   an engine supported by the chassis; and
   a service step structure pivotably connected to the cab, and the service step structure is configured to be stowed interior to an exterior body of the vehicle and deployed when the cab is raised.

2. The vehicle of claim 1, wherein the level cab is positioned forward of and elevated in relation to the engine, wherein the engine is exposed, and the service step structure includes one or more steps positioned exterior to the cab, and the steps are positioned to allow access to a cab entry.

3. The vehicle of claim 1, wherein the level cab is positioned over the engine to conceal the engine, and the service step structure is in a lying position interior to an exterior body of the vehicle.

4. The vehicle of claim 1, wherein the service step structure is connected to the cab via a tilt axis pivoting assembly.

5. The vehicle of claim 4, wherein a tilt axis of the tilt axis pivoting assembly is tilted with respect to a transverse plane.

6. The vehicle of claim 5, wherein the tilt axis is parallel to a frontal plane.

7. The vehicle of claim 4, wherein a tilt axis of the tilt axis pivoting assembly is tilted with respect to a frontal plane and parallel to a transverse plane.

8. The vehicle of claim 4, wherein a tilt axis of the tilt axis pivoting assembly is tilted with respect to a frontal plane and a transverse plane.

9. The vehicle of claim 1, wherein the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane.

10. The vehicle of claim 9, wherein the first and second axes are parallel to a frontal plane.

11. The vehicle of claim 10, wherein the first axis is spatially separated from the second axis along a line parallel with the frontal plane.

12. The vehicle of claim 9, wherein a distal end of the first bar is connected to the second bar at a juncture, and the second bar extends distally from the juncture and comprises one or more foot pegs.

13. The vehicle of claim 4, wherein the service step structure comprises a first bar attached to the cab via a first tilt axis pivoting assembly, a second bar attached to the cab via a second tilt axis pivoting assembly, wherein the second tilt axis pivoting assembly is inboard of the first tilt axis pivoting assembly, and the first and second axes are tilted with respect to a transverse plane and are parallel to a frontal plane.

14. The vehicle of claim 13, wherein
   the first bar comprises:
      a first straight segment extending perpendicular to the first tilt axis, wherein the first segment extends posteriorly from the frontal plane;
      a second straight segment; and
      a first bend having an obtuse angle that connects the first segment to the second segment;
   and wherein the second bar comprises:
      a third straight segment extending perpendicular to the second tilt axis, wherein the third segment extends anteriorly from the frontal plane;
      a fourth straight segment;
      a second bend having an obtuse angle that connects the third segment to the fourth segment;
      a fifth straight segment;
      a third bend having an obtuse angle that connects the fourth segment to the fifth segment; and
   the distal end of the second segment is rigidly connected to the fourth segment.

15. The vehicle of claim 14, wherein the first, second, third, and fourth segments are tilted with respect to a side plane passing through a longitudinal center of the cab, and the fifth segment is parallel to the side plane.

16. The vehicle of claim 14, wherein the fifth segment includes one or more foot pegs.

17. The vehicle of claim 4, wherein the cab includes one or more steps, and the one or more steps of the service step structure are aligned with the one or more steps of the cab.

18. The vehicle of claim 1, further comprising a cab repositioning system and a linkage, wherein the linkage is pivotably connected to the repositioning system and to the service step structure.

19. The vehicle of claim 18, wherein the repositioning system comprises a control arm, wherein the control arm is pivotably connected to the chassis and pivotably connected to the cab, and the service step structure includes at least one bar connected to the cab via a tilt axis pivoting assembly, and the linkage is connected to the bar and the control arm.

20. The vehicle of claim 19, wherein a pivot axis of the control arm at the cab and a pivot axis of the control arm at the chassis are normal to a side plane.

21. The vehicle of claim 18, further comprising a cab repositioning system, wherein the repositioning system comprises at least four control arms pivotably connected to the chassis and pivotably connected to the cab, wherein a pivot axis of each of the control arms is normal to a side plane.

22. The vehicle of claim 21, wherein one or more control arms are connected to a hydraulic cylinder.

* * * * *